No. 785,293. PATENTED MAR. 21, 1905.
A. DIATTO.
ELECTRIC TRAMWAY.
APPLICATION FILED SEPT. 30, 1902.
2 SHEETS—SHEET 1.
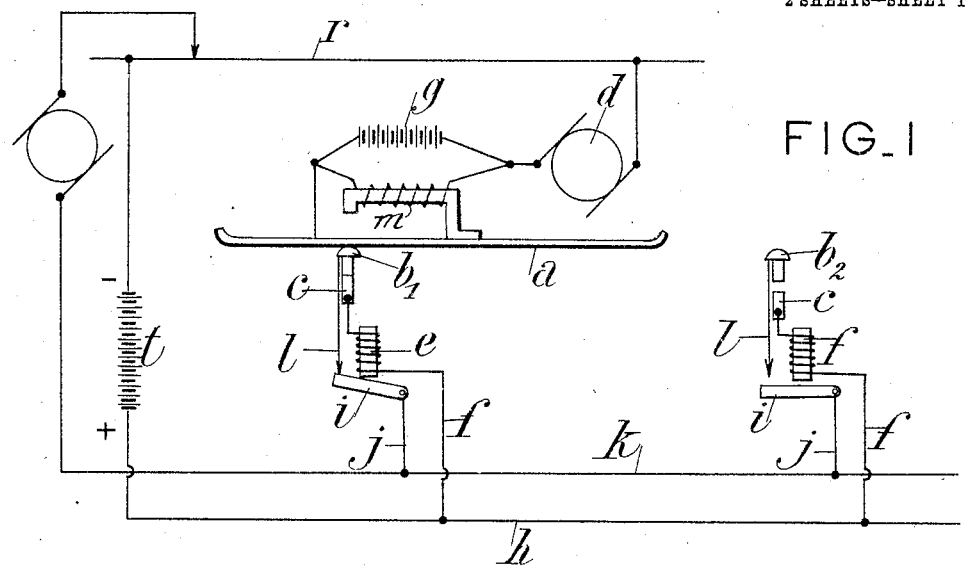
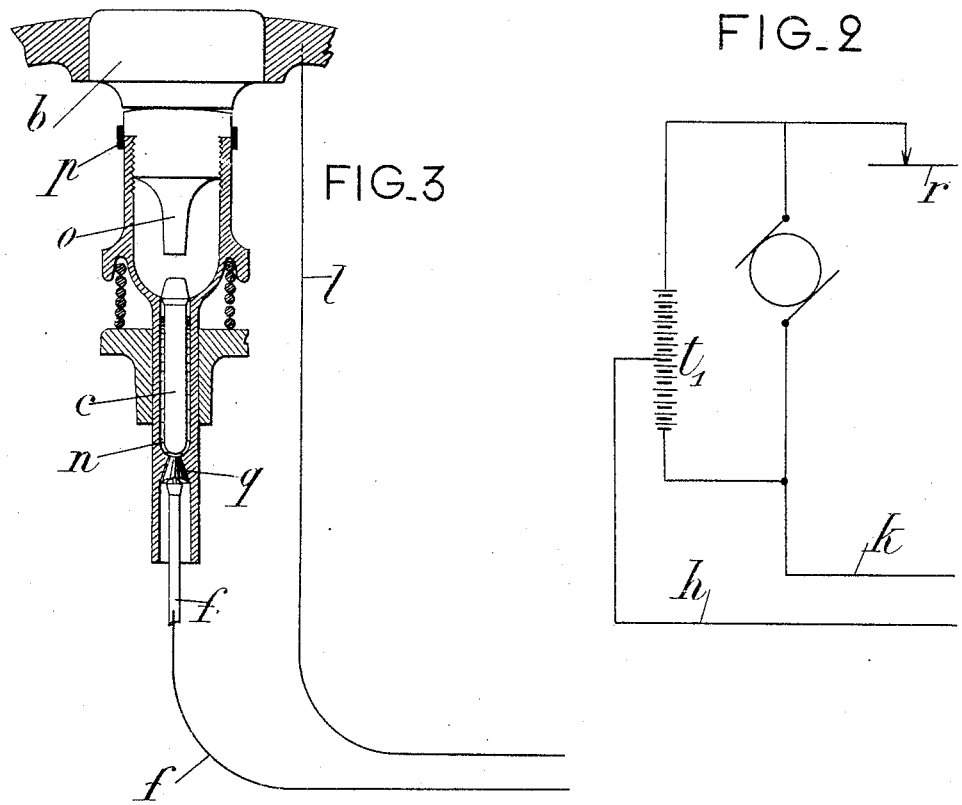
WITNESSES
Wm. Kuehne
Wm. M. Golden Jr.
INVENTOR
Alfredo Diatto
By Richardson
ATTORNEYS No. 785,293. PATENTED MAR. 21, 1905.
A. DIATTO.
ELECTRIC TRAMWAY.
APPLICATION FILED SEPT. 30, 1902.

2 SHEETS—SHEET 2.

WITNESSES
INVENTOR
Alfredo Diatto
BY
ATTORNEYS

No. 785,293.       Patented March 21, 1905.

UNITED STATES PATENT OFFICE.

ALFREDO DIATTO, OF TURIN, ITALY.

ELECTRIC TRAMWAY.

SPECIFICATION forming part of Letters Patent No. 785,293, dated March 21, 1905.

Application filed September 30, 1902. Serial No. 125,392.

*To all whom it may concern:*

Be it known that I, ALFREDO DIATTO, a subject of the King of Italy, residing at Turin, Italy, have invented certain new and useful Improvements in Electric Tramways, (for which I have obtained a patent in France, dated March 5, 1902, No. 319,340,) of which the following is a full, clear, and exact specification.

The object of my invention is to provide a system of electric traction with superficial contacts belonging to that category where a magnetic interrupter actuated by a magnetized rod dragged by the car closes the circuit of a feeble current working an electromagnetic relay which connects the superficial contact with the underground cable.

The invention is illustrated in the accompanying drawings, in which—

Figure 4:
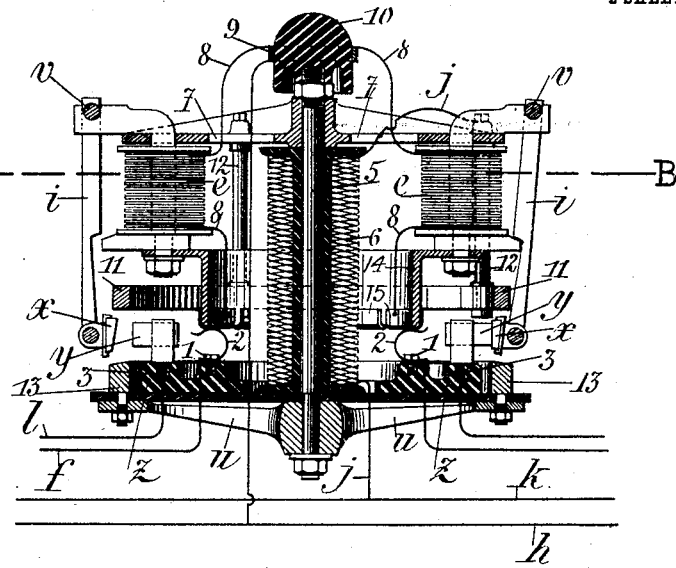
Figure 5:
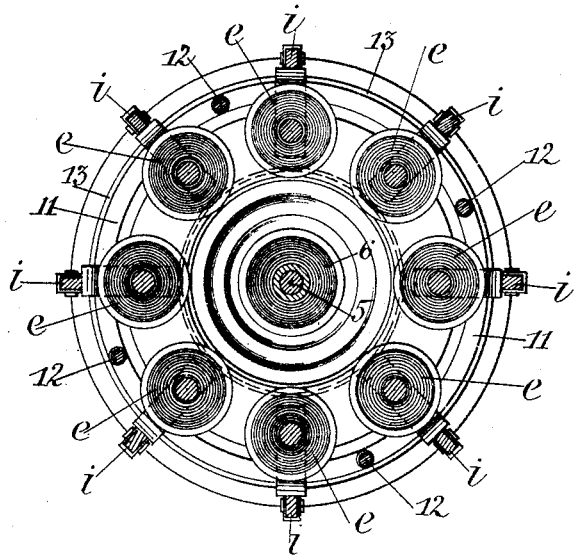

Figures 1 and 2 are diagrammatic views. Fig. 3 is a vertical section of the magnetic interrupter. Fig. 4 is a vertical section of a distribution-box containing a group of relays. Fig. 5 is a section on line A B of Fig. 4.

In Fig. 1, $a$ is a rod conveniently suspended to the carriage and of sufficient length to come into contact with two successive contact-buttons $b'$ $b^2$. In the car is a small accumulator-battery $g$, whose circuit, passing through a winding $m$, maintains the magnetism of rod $a$. When the rod $a$, being magnetized, reaches contact $b'$, the magnetic interrupter $c$ is attracted, and a current will be thrown into wire $f$, which is attached to it. This wire winds around an electromagnet $e$, constituting the relay, and rejoins a wire $h$, which ends at the positive pole of a small battery $t$, whose negative pole is connected with the rails $r$, Fig. 1. Battery $t$ must have a voltage equal to about one-half of that of the line, so that in the two cases referred to in the description relay $e$ is always passed by a current having the desired intensity— that is to say, which is neither too weak nor too strong. If, for example, the battery would only absorb one-quarter of the voltage of the line, then three-quarters would remain for the relay $e$. However, if in this case the battery should have to furnish itself the current to the relay $e$ the latter will have at its terminals only the quarter of the line voltage, and as the relay $e$ is adjusted for a determined current a too weak current would be insufficient, and a too strong current might heat or even burn it. Consequently battery $e$ must have the indicated voltage. If there is at the work-shops a buffer-battery or a battery regulating the current, wire $h$ will connect itself on half of said battery $t'$, Fig. 2. The electromagnet $e$ attracts, then, the armature $i$, which establishes the communication between the underground cable K and the contact $b'$ through the intermediary of wires $j$ and $l$. The current of the line passes then through rod $a$, winding $m$, motor $d$, and rejoins rail $r$. As soon as the current taken by the car exceeds the current that can be delivered by the battery $g$ this latter begins to charge itself for future use. When the pavement of contact $b^2$, supposed to be at rest, is attained by the rod $a$, this latter, being yet magnetized by preceding pavement $b'$, will act in a similar manner, and the movement will continue.

If for any reason whatever the communication with the underground cable should get broken, the relay $e$ instead of being fed by a current furnished from the rod will be fed for the time by a current of the same intensity and from the wire $h$ which will reach the rails by passing through the motor; but as soon as the pavement is replaced in communication with the underground cable K the small current traversing the relay $e$ will reverse promptly and the work retake its normal course.

Fig. 3 shows the magnetic interrupter of soft iron $c$ disposed under the contact $b^2$. This interrupter plunges into a mercury vessel $n$, whose upper prolongation is screwed on a prolongation $o$ of the magnetic piece of the contact-pavement $b$. The tightness of this assemblage is completed by a rubber ring $p$. The wire $f$, which is a prolongation of the winding of the relay, communicates with the interrupter $c$ through the piece $q$ and the mercury $n$ of the vessel. This disposition is similar to the one employed when transmitting directly the principal current from the cable K to the contact-pavement, only it is considerably reduced in dimensions.

Figs. 4 and 5 represent a box of circular distribution holding a certain number of relays distributed around its axis. In Fig. 4 two of these relays are shown, the left one at rest and the right one working. Each relay is composed of the electromagnet $e$ of the armature $i$, oscillating on an axis $v$ and having on its prolongation a carbon $x$. As soon as the armature or keeper is attracted the carbon $x$ comes into contact with a fixed carbon $y$, mounted on an isolating-piece $z$. The wire $f$, coming from the interrupter $c$, Fig. 3, connects with terminal 1, mounted on the insulating part $z$, and communicating by a metallic spring 2 to winding 8 of the electromagnet $e$, whose other extremity rejoins wire $h$ by passing through the collector-ring 9, mounted on an isolating-head 10. Wire 1, coming from the contact-pavement $b$, Fig. 3, connects to a terminal 3, communicating with the fixed carbon $y$. A vertical axis of iron 5, fixed in the center of the basis $u$, carries a coil 6 of thick wire whose winding is constituted by wire $j$, which brings the current of the principal cable K. The wire $j$ is connected to the metallic plate 7, bearing the coils $e$, and bent to pass from there through the articulations $v$ and the armatures $i$ to any one of the carbons $x$. As explained in Fig. 1, everything with this disposition will take place as stated. The iron axis 5, magnetized by the passage of the current into the coil 6, forms a magnetic blower capable of extinguishing any arcs that could form themselves between the carbons $x$ and $y$ at the time of the rupture of their contact. To this effect the axis 5 is in magnetic communication partly with an iron crown 11 by the plate 7 with the columns 12 and partly with another iron crown 13 with the plate $u$. Between crowns 11 and 13, which have become the poles of the central electromagnet, the magnetic blowing will take place in a direction perpendicular to the arc.

I have said that the voltage of battery $t$ must be about one-half of that of the main generator. The term "about" must be used if it is considered important that the current passing bobbin $e$ should in the two cases have almost exactly the same intensity. However, practically it is not necessary that this condition be absolutely fulfilled, considering the sufficiently large voltage at the terminals of $e$, which is passed by a weak current, on account of winding $e$ offering a strong resistance.

During the infinitely short time in which battery $t$ works the motor does not take principal current and its circuit offers resistance, which is insignificant as compared with the resistance in $e$. Consequently the voltage of $t$ will be found almost entirely at the terminals of $e$ and only a small fraction of said voltage will be absorbed by the motor $d$.

Having now described my invention, what I claim as new, and desire to secure by Letters Patent, is—

1. In an electrical-railway system, a magnetized contact-bar carried by the car, superficial contact devices along the road adapted to be closed by said bar, an electromagnetic circuit-closing device for the motive circuit and means for sending a weak current from the magnetized bar through said superficial contact devices to operate the electromagnetic devices and close the main circuit, substantially as described.

2. In an electrical-railway system, a main conductor and a suitable generator for supplying current thereto, superficial contact devices along the line, a bar carried by the car adapted to close said contacts, said bar having electrical connections with the motor, a secondary conductor, a current-generator therefor for producing a current of approximately half the voltage of the main line, branch connections from said secondary conductor to said contact devices, relays included in said branch connections for electrically connecting the main conductor with said superficial contacts, substantially as described.

3. In an electrical-railway system, a main conductor and a suitable generator for supplying current thereto, superficial contact devices along the line, a bar carried by the car adapted to close said contacts, said bar having electrical connections with the motor, a secondary conductor, a current-generator therefor for producing a current of approximately half the voltage of the main line, branch connections from said secondary conductor to said contact devices, a plurality of relays included in said branch connections for electrically connecting the main conductor with said superficial contacts, and an electromagnet around which said relays are grouped and which is included in the main circuit, substantially as described.

In witness whereof I hereunto set my hand in presence of two witnesses.

ALFREDO DIATTO.

Witnesses:
G. B. ZANARDO,
CLEMENTE GIUCHETTI.